United States Patent

Cilliere et al.

[11] Patent Number: 5,174,630
[45] Date of Patent: Dec. 29, 1992

[54] RESILIENT SEAT BACK RETURN DEVICE

[75] Inventors: François Cilliere; François Baloche, both of Flers, France

[73] Assignee: Bertrand Faure Automobile, Bois d'Arc, France

[21] Appl. No.: 736,248

[22] Filed: Jul. 26, 1991

[30] Foreign Application Priority Data

Jul. 30, 1990 [FR] France .................. 90 09680

[51] Int. Cl.⁵ .................................... B60N 2/22
[52] U.S. Cl. ...................... 297/379; 297/306; 297/362; 297/367
[58] Field of Search ............ 297/363, 365, 367, 368, 297/379, 306, 362

[56] References Cited

U.S. PATENT DOCUMENTS

| | | | |
|---|---|---|---|
| 2,728,379 | 12/1955 | Perry | 297/363 |
| 2,912,045 | 11/1959 | Milly | 297/363 |
| 4,312,537 | 1/1982 | Lindenberg | 297/379 X |
| 4,593,952 | 6/1986 | Berghof | 297/363 X |
| 4,659,146 | 4/1987 | Janiaud | 297/365 X |

FOREIGN PATENT DOCUMENTS

| | | | |
|---|---|---|---|
| 2384646 | 11/1978 | France | 297/363 |
| 1408213 | 10/1975 | United Kingdom | 297/365 |

Primary Examiner—Peter R. Brown
Attorney, Agent, or Firm—Robert W. Becker & Associates

[57] ABSTRACT

A resilient seat back return device used in two-door vehicles is provided. Between the mobile flange of the articulation and the fixed flange of the same articulation a connection link is pivotally mounted to the sitting portion flange whereby, the connection link is connected by a small helical spring to the module flange of the seat back so that, when the seat back is lowered over the sitting portion, the spring is in an unstressed state while the spring is normally under tension when the seat back occupies an intermediate position and is sufficiently stressed when the seat back is placed in the prolongation of the sitting portion to form a berth, the spring then occupying a position in which it is sufficiently powerful to move up the seat back from the seat. Due to its fixation points a spring of small volume and of short elongation but with a very high pulling force is used.

2 Claims, 2 Drawing Sheets

RESILIENT SEAT BACK RETURN DEVICE

BACKGROUND AND OBJECT OF THE INVENTION

More and more automobile vehicles are so-called three-door vehicles, with two side doors and a hatchback. Because of the two side doors, sliding seats are used the back of which has to be folded over the sitting portion in order to allow passengers an easy access to the vehicle backseat. Moreover, each front seat is provided with a back the inclination of which is adjustable but also foldable rearwardly so as to form two berths with the sitting portion of the backseat.

These requirements for the seat backs demand a mounting of the back of each seat on the articulation mechanisms such that with respect to the sitting portion not only a discontinuously adjustable mechanism is provided but also complementary members facilitating either the frontwardly inclination or the rearwardly inclination of the seat back, so that forwardly inclined position to provide access for the rear passengers of the two-door vehicles on the one hand, but also to the horizontal position of the seat back for the so-called berth function may be realized. Therefore these complementary members have to be not only very strong, small in size but also very simple to manufacture and to mount so as to be inexpensive for vehicle seats.

Means have been known for providing a solution to this problem, but these means are usually bulky, unreliable and in any case costly. This is the reason why it is desirable to reconsider the problem and to find a simple, less bulky and inexpensive device.

It is therefore an object of the present invention provide an improvement on an articulation mechanism for a seat back with a complementary mechanism allowing the lowering of the seat back frontwardly with a return member of sufficient strength but little bulk, thus offering a solution which is robust, simple and relatively inexpensive.

SUMMARY OF THE INVENTION

According to the invention, a resilient seat back return device used in two-door vehicles, the seat being onto the one hand adapted to be folded back on the sitting portion of the seat for allowing the passage of the passengers occupying the vehicle backseat, and on the other hand used for forming a berth by folding the seat back in the prolongation of the sitting position. The seat back is at the same time adjustable in various inclinations with respect to the seat as such with the assitance of one or two articulation mechanisms with blocks. The invention is characterized in that there is provided between the mobile flange of the articulation and the fixed flange of the same articulation a connection link articulated on an axis rigidly connected to the sitting portion flange, the connection link being connected by a small helical spring to the mobile flange of the seat back so that, when the seat back is lowered over the sitting portion, the spring is decompressed while the spring is normally under tension when the seat back occupies an intermediate position and is sufficiently stressed when the seat back is placed in the prolongation of the sitting portion for forming a berth, whereby the spring in this position is sufficiently powerful for moving up the seat back from the seat and due to its fixation points, a small-size spring of a short elongation but with a very high pulling force is used.

Various other features of the invention will become more apparent from the following detailed description.

BRIEF DESCRIPTION OF THE DRAWINGS

An embodiment of the object of the invention is shown by way of a non limiting example in the accompanying drawings.

DETAILED DESCRIPTION OF THE PREFERRED EMBODIMENT

Figure 1:
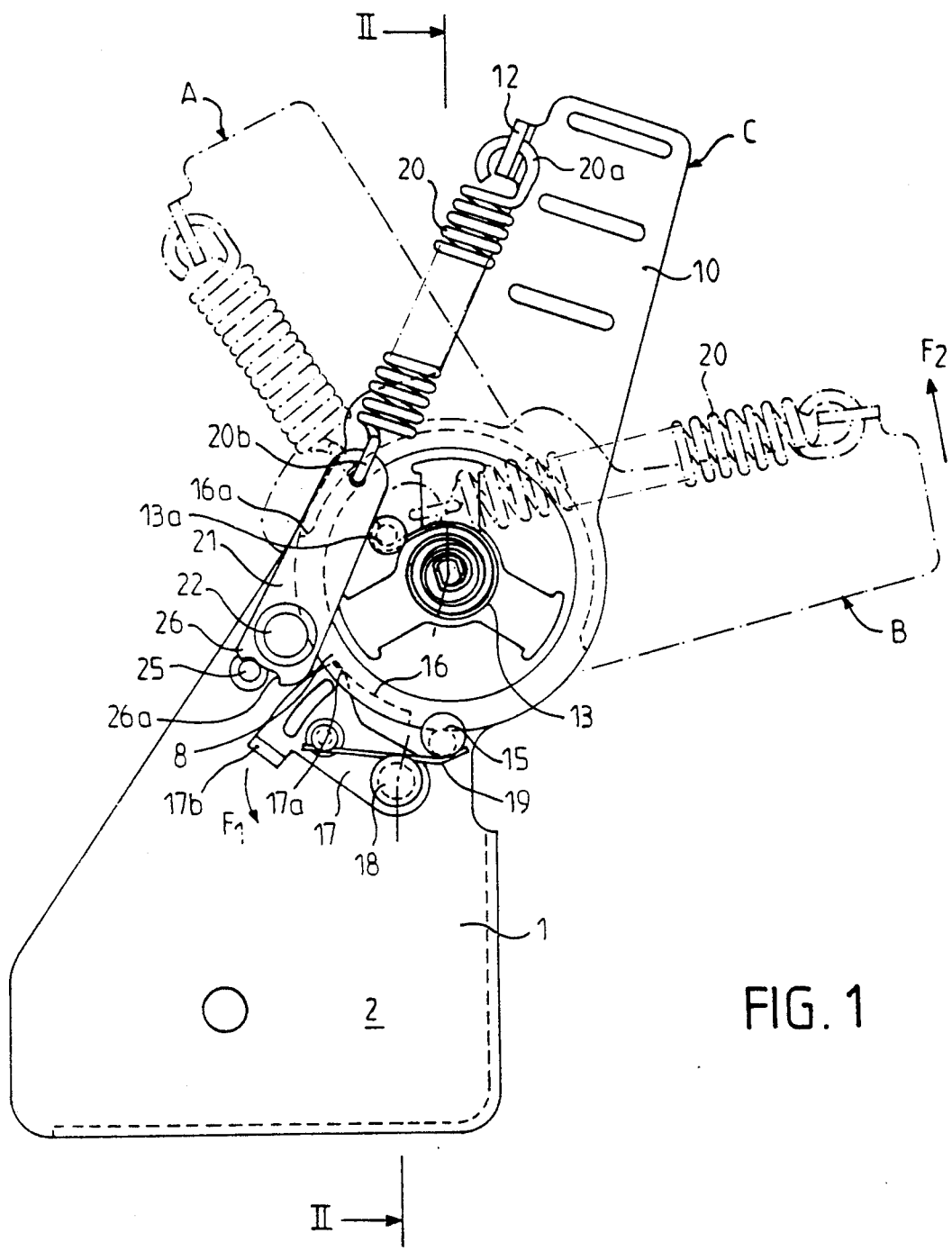
FIG. 1 is a elevational side view of a device allowing the return to a normal position of the vehicle seat back.
Figure 2:
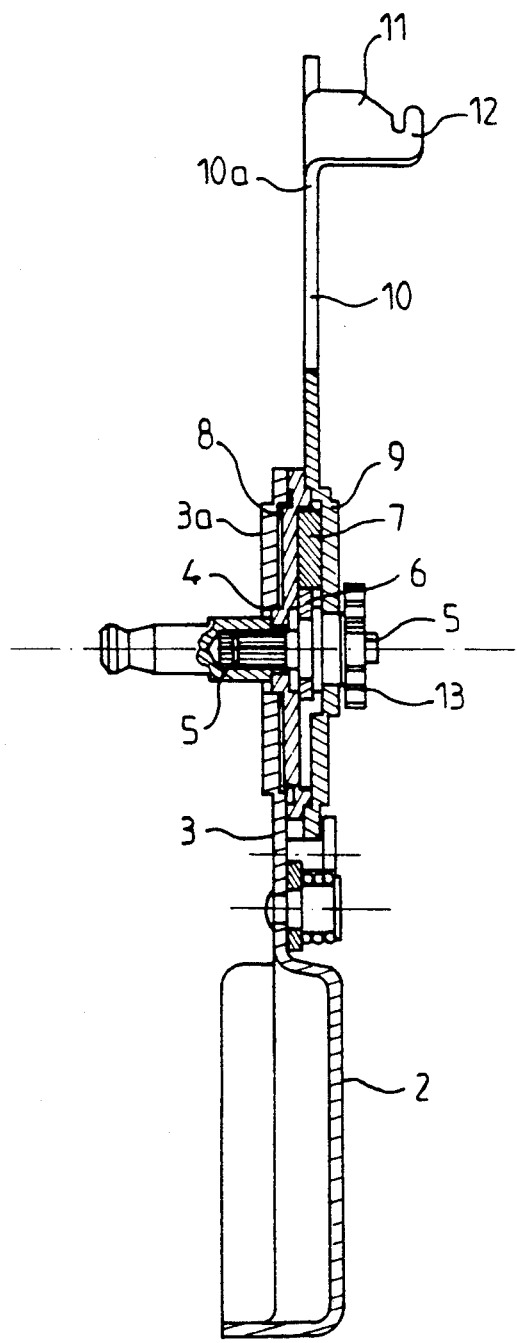
FIG. 2 is a sectional front view of the device of FIG. 1.

As may be seen in the drawings, an iron fitting 1 which is rigidly connected to the seat back armature is fixed by any convenient means on either side of the latter and in the rear. This iron fitting 1, which comprises a wide gusset 2 covering the rear portion of the sitting portion armature and a portion in the form of a flange 3 the upper portion 3a of which is recessed, has in its center a bore 4 for the passage of a splined shaft 5 adapted for rotating a cam 6 which pushes back blocks 7. The blocks 7 which are disposed at 120° with respect to one another are formed at their upper portion with a toothing (not shown) cooperating simultaneously with inner serrations of a disk 8 and an element carried by the recess 9 of flange 10 which is rigidly connected to the lower portion of the respective seat back armature. This flange 10 which is transversely strengthened is formed, at its upper portion 10a, with a finger 11 bent 90° with respect to the flange 10 and ending in a hook 12. The splined shaft 5, which extends through the disk 8, the cam 6, the recess 9 of flange 10, carries at its other end a spiral spring 13 which is attached with one end 13a to the recess 9 and rotates the splined shaft 5 so as to place cam 6 in the position in which blocks 7 are pushed back in the toothings of disk 8 and of recess 9, thereby blocking the mobile flange 10 on the fixed flange 3 which is rigidly connected to the sitting portion armature.

This represents the known mounting of block articulations disposed at 120°. The mobile flange 10 is retained at its lower portion by one or several pins 15. In the present case, there is also provided in the lower portion of disk 8 a step 16 for locking via a latch 17 articulated on an axis 18, that is rigidly connected with the fixed flange 3, and pushed by a spring 19 with its end 17a the disk 8 with respect to the fixed flange 3 and therefore with respect to the side sitting portion iron fitting 1.

In the case where lug 17b is drawn in the direction of arrow $F_1$ (see FIG. 1), the latch 17 is disengaged from the step 16 and at that moment it is possible to drive in rotation the disk 8 and the side flange 10 which is rigidly connected to the seat back toward the two positions A, B (see FIG. 1). When the seat back is moved to the position A (see FIG. 1, the position being shown in phantom), a helical spring 20, attached with one end 20a to the hook 12 and with its other end 20b to a connection link 21 that is pivotably connected to an axis 22 which is rigidly connected to the side iron fitting 1, is completely unstretched. The latch 17 is then in cooperation with the step 16a.

For the position B or any intermediate position between position A and position B, the connection link 21 rotates about the axis 22, moving until the abutment 25 contacts the end 26a of cut-out 26, at the end of the connection rod 21 thereby stretching the spring 20 as shown in FIG. 1. In this position, the seat back is therefore used practically in the horizontal position and one can therefore form a berth with the sitting portion, the front seat back and the sitting portion of the backseat as is common in vehicles.

Since the spring 20 in position B has been set under tension but since at the same time it has rotated with connection link 21 over a wide angle eventually exceeding 50°, one can see in FIG. 1 that on the one hand the connection link 21 has tilted and on the other hand the spring 20 is not much elongated, which avoids using a long spring while providing a pulling force which is very large. Indeed, spring 20 projects over the articulation axis only by a small extent, thus having a very powerful assembly with little space requirement. Thus, the seat back is placed in the berth position the berth being formed by the front seat (sitting portion and back) with the sitting portion of the backseat.

In order to bring the seat back from position B to position C, the only thing to do is to unlatch the toothings of the blocks 7 from the toothings of the mobile flange 10 by rotating the cam 6 via the splined shaft 5, so that the seat back moves upwardly under the action of the spring in the direction of arrow $F_2$ (see FIG. 1). Thus, the connection rod 21 is pivoted back which resumes then the position shown in solid lines in FIG. 1. At the same time, spring 20 is contracted so as to resume the tension of position C (see FIG. 1). The movement is limited by an abutment 25 which is, rigidly connected to flange 1 and which can move within a cut-out 26 formed in the lower portion of connection link 21. Since the effort of spring 20 is very limited by the constraint to which it is subjected when passing from position C to position A as well as when passing from position B to position C, it is therefore possible to mount a spring of small size and little bulk which is also inexpensive.

This is contrary to the mechanisms using torsion bars having implantation constraints and in particular a large volume.

The same applies to leaf springs and to the spiral springs which have in addition the disadvantage of being costly.

Finally, this construction ensures the pivoting of the seat back over a range of more than 90° and avoids in the berth position the interference hazards of the traction spring or springs 20 with the structure.

The solution offered by the present invention ensures the return of the seat back into its common operating position of the vehicle while allowing a great range of rotary movement of this seat back and offers a better comfort during use since there is only a small variation of the return torque.

We claim:

1. A resilient seat back return device for vehicle front seats for two-door vehicles, with a seat back being foldable onto a sitting portion for allowing passengers access to a rear seat, being foldable towards a rear seat for forming a berth, and being adjustable in various inclined positions relative to a sitting portion, said resilient seat back return device comprising:
   an articulation mechanism comprising a mobile flange connectable to a back seat and a fixed flange connectable to a sitting portion, said mobile flange being drivingly connected to said fixed flange;
   a connection link pivotably connected to said fixed flange;
   a helical spring connected with a first end thereof to said mobile flange and with a second end thereof to said connection link, said helical spring being unstressed when said mobile flange is moved to a position in which a seat back is folded over a sitting portion, and being under tension when said mobile flange is in a position corresponding to an essentially upright position of a seat back, and being stressed in a position in which a seat back is folded towards a rear seat.

2. A device according to claim 1, wherein said connection link is provided with a cutout at an end thereof that is pivotably connected to said fixed flange, and wherein said fixed flange is provided with an abutment that cooperates with said cutout to limit a displacement angle of said connection link.

* * * * *